(12) United States Patent
Hirano

(10) Patent No.: US 7,069,565 B2
(45) Date of Patent: Jun. 27, 2006

(54) DISK IDENTIFYING DEVICE

(75) Inventor: Shintaro Hirano, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 242 days.

(21) Appl. No.: 10/694,218

(22) Filed: Oct. 28, 2003

(65) Prior Publication Data

US 2004/0139454 A1    Jul. 15, 2004

(30) Foreign Application Priority Data

Oct. 29, 2002  (JP) ............................. P2002-314609

(51) Int. Cl.
    *G11B 33/04* (2006.01)
(52) U.S. Cl. ...................................... 720/606
(58) Field of Classification Search ................ 720/605, 720/606; 369/30.8, 30.36, 30.93, 30.98, 369/30.06

See application file for complete search history.

(56) References Cited

U.S. PATENT DOCUMENTS

| 5,293,362 A * | 3/1994 | Sakurai et al. ............. 369/30.8 |
| 5,654,944 A * | 8/1997 | Lee et al. ................. 369/30.06 |
| 5,742,571 A * | 4/1998 | Hoshino et al. ......... 369/30.98 |
| 6,005,831 A * | 12/1999 | Park .......................... 369/30.8 |
| 6,091,677 A * | 7/2000 | Akiyama et al. ......... 369/30.93 |
| 6,810,524 B1 * | 10/2004 | Deo ............................ 720/606 |
| 2004/0081035 A1 * | 4/2004 | Fujishima ................ 369/30.36 |

FOREIGN PATENT DOCUMENTS

| JP | A-6-4985 | 1/1994 |
| JP | A-6-150523 | 5/1994 |
| JP | 2002-216415 | 8/2002 |

* cited by examiner

*Primary Examiner*—Tianjie Chen
(74) *Attorney, Agent, or Firm*—Morgan, Lewis & Bockius LLP

(57) ABSTRACT

In a disk identifying device, when a slanting reflecting face is irradiated with light emitted from a light emitting element while a rotary tray is rotating, most of the light reflected from the slanting reflecting face is not incident on a light receiving element, whereas when a flat reflecting face is irradiated with the light emitted from the light emitting element, most of the reflected light is incident on the light receiving element. Since the receiving element receives the reflected light in a pattern corresponding to an assigned number of a pertinent disk placing portion, the rotary position of the rotary tray is detected. Where a disk detecting hole is irradiated with the light emitted from the light emitting element, the presence or absence of a disk on the pertinent disk placing portion is detected by the presence or absence of the reflected light received by the light receiving element.

8 Claims, 5 Drawing Sheets

DISK IDENTIFYING DEVICE

BACKGROUND OF THE INVENTION

1. Field of the Invention

This invention relates to a disk reproducing apparatus for reproducing recorded information on optical disks placed on a plurality of disk placing portions, and more particularly to a disk identifying device for stopping the disk placing portions at prescribed positions by identifying numbers assigned to the disk placing portions.

2. Description of the Related Art

A disk identifying device which is included in a disk reproducing apparatus for selectively reproducing a plurality of disks identifies a disk number previously assigned using a selective signal for the disk number during a disk reproducing mode, and stops a rotary tray at a reproducing position. Such a disk identifying device requires a rotary tray sensor for detecting the rotary position (position of a disk placing portion) and a disk detecting sensor for detecting whether or not a pertinent disk is located at the disk placing portion.

A disk reproducing apparatus disclosed in JP-A-6-4985 (claims 1 and 2, FIG. 7) includes a tray portion which is accommodated in and discharged from a body of a disk reproducing apparatus, a disk holding portion designed to hold a disk on the tray portion, a disk presence/absence detecting hole made within the range of the disk holding portion of the tray portion, a light emitting means and a light receiving means which are located to be opposite to each other at upper and lower positions with respect to the tray portion at the positions through which the disk presence/absence detecting hole passes on the way where the tray portion is accommodated in and discharged from the reproducing apparatus body, a disk presence/absence determining means for determining the presence/absence of the disk at the disk holding portion using a light received output from the light receiving means while the tray is accommodated, and a stand-by operation directing means for directing a stand-by operation for reproducing the disk when the disk presence/absence determining means determines that the disk is present.

In the disk reproducing apparatus, the disk holding portion is a large-diameter disk holding portion for holding a large-diameter disk. The disk reproducing apparatus further includes a rotary table rotatably arranged on the tray portion, a plurality of small-diameter holding portions formed on the rotary table so as to hold small-diameter disks around the rotary center of the rotary table, a table rotary position detecting hole located at a position which is outside the disk holding portion and the small-diameter disk holding portions of the tray portion and through which the optical axis of the light emitting means and light receiving means passes when the rotary table rotates with the tray portion being accommodated in the body of the reproducing apparatus, and a table rotary position detecting means for detecting the rotary position of the rotary table using the light received output from the light receiving means with the tray being accommodated within the body of the reproducing apparatus.

As described above, this disk reproducing apparatus includes a disk presence/absence determining means for determining the presence/absence of the disk at the disk holding portion using a light received output from the light receiving means while the tray is accommodated. However, since the disk holding portion is a large-diameter disk holding portion which holds a large-diameter disk, the disk presence/absence determining means determines the presence or absence of the large-diameter disk on the large-diameter disk holding portion, and so does not correspond to a disk detecting senor for detecting the presence or absence of the disks (small-diameter disks) placed on the disk placing portions (small-diameter disk holding portions) of the rotary tray (rotary table).

In this disk reproducing apparatus, the table rotary position detecting means for detecting the rotary position of the rotary table using the light received output from the light receiving means with the tray being accommodated within the body of the reproducing apparatus corresponds to the rotary tray sensor for detecting the rotary position (position of the disk placing portion) of the rotary sensor. In this disk reproducing apparatus, the presence/absence of the large-diameter disk placed on the large-diameter disk holding portion is detected by the disk presence/absence determining means, and the rotary position of the rotary table is detected by the table rotary position detecting means.

A disk apparatus disclosed in JP-A-6-150523 (claims 1, 2) includes, in order to detect the stopping position and initial position of each disk placing face of a rotary table and detect the rotary speed of the rotary table, a plurality of slits each having a desired width or concentric skirts having reflecting face sections and a single light emitting/receiving device which cooperates with the skirts. In order to detect the presence/absence of the disk on each disk placing face of the rotary table when the tray comes to a carry-in position, the disk apparatus includes an optical sensor located at a position to receive the light from an optical head. By emitting light from an optical head at a rest position and rotating the rotary table, the light is reflected by the disk if it is present or comes from the optical disk if no disk is present.

In this disk apparatus, the light emitting/receiving device corresponds to the rotary tray sensor for detecting the rotary position of the rotary tray (rotary table), and the optical sensor corresponds to the disk detecting senor for the presence/absence of the disk placed on the disk placing portion (disk placing face) on the rotary tray. Therefore, this disk apparatus detects the presence/absence of the disk to be placed on the disk placing face using the optical sensor and detects the rotary position of the rotary table using the light emitting/receiving device.

A disk identifying device disclosed in JP-A-2000-216415 (claims 1 and 2, FIG. 7) includes a plurality of small holes made on disk placing portions which represent whether or not disks are placed and assigned numbers of the disk placing portions, a light emitting element provided on the lower side of a rotary tray toward the disk placing portions, a first light receiving element provided on the upper side of the rotary tray which produces a detecting signal when it receives the light emitted from the light emitting element which has passed any one of the small holes, and a second light receiving element provided on the lower side of the rotary tray which produces a detected signal when it receives the light emitted from the light emitting element which is reflected from the rear surface of the disk blocking the small hole or the rear surface of the disk placing portion.

This disk identifying device includes a plurality of small holes made on each of disk placing portions, and having different arrangement patterns for the respective disk placing portions, a light emitting element provided on the lower side of a rotary tray toward the disk placing portions, a first light receiving element provided on the upper side of the rotary tray which produces a detecting signal when it receives the light emitted from the light emitting element which has passed any one of the small holes, and a second light receiving element provided on the lower side of the rotary tray which produces a detected signal when it receives the light emitted from the light emitting element which is reflected from the rear surface of the disk blocking the small hole or the rear surface of the disk placing portion.

When the detected signal is transmitted from the first light receiving element, this disk identifying device determines that the disk is not placed on the pertinent disk placing portion, whereas when the detected signal is transmitted from the second light receiving element, the disk identifying device determines that the disk is placed on the pertinent disk placing portion. In this manner, the disk identifying device detects the presence/absence of the disk on the pertinent disk placing portion. Further, the disk identifying device detects the rotary position of the rotary tray by identifying the assigned number of the disk placing portion on the basis of the interval between inputting times of the detected signal and the number of inputs within a prescribed period, etc. Furthermore, the disk identifying device detects the rotary position of the rotary tray by identifying the assigned number of the disk placing portion on the basis of the arrangement pattern of the small holes.

However, although the disk reproducing apparatus disclosed in JP-A-6-4985 is provided with the disk presence/absence determining means for determining the presence/absence of the disk at the disk holding portion using a light received output from the light receiving means while the tray is accommodated, since the disk holding portion is a large-diameter disk holding portion for holding a large-diameter disk, the disk presence/absence determining means determines the presence/absence of the large-diameter disk on the large-diameter disk holding portion. Therefore, the disk presence/absence determining means does not correspond to the disk detecting sensor for detecting the presence/absence of the disk (small-diameter disk) placed on each of the disk placing portions (small-diameter disk holding portions) on the rotary tray (rotary table). Accordingly, the disk reproducing apparatus cannot detect whether or not the disk is present on each of the disk placing portions arranged on the rotary tray.

The disk apparatus disclosed in JP-A-6-150523 detects the presence/absence of the disk to be placed on the disk placing portion (disk mounting face) using the optical sensor and detects the rotary position of the rotary tray (rotary table) using the light emitting/receiving device. However, this disk apparatus requires two sensors of the optical sensor and the light emitting/receiving device for detection of the presence/absence of the disk and of the rotary position of the rotary tray, which is likely to result in a complicated structure and increased costs.

The disk identifying device disclosed in JP-A-2000-216415 employs a single light-emitting element and two light-receiving element for detection of the presence/absence of the disk and of the rotary position of the disk. This is identical to use of two sensors, and is likely to result in a complicated structure and increased costs.

SUMMARY OF THE INVENTION

This invention has been accomplished to solve these problems, and intends to provide a disk identifying device simplified in structure and reduced in costs by applying a configuration in which a rotary tray rotary position detecting means corresponding to a rotary sensor and a disk presence/absence detecting means corresponding to a disk detecting sensor are commonly used.

In order to attain the above object, according to a first aspect of the invention, there is provided a disk identifying device including: a rotary tray having a plurality of disk placing portions on each of which a disk as a recording medium is to be placed and each of which has an assigned number; a belt-like portion concentrically formed on a rear surface of the rotary tray, the belt-like portion having disk detecting holes each corresponding to a position of each of the disk placing portions, and reflecting areas each formed between adjacent disk detecting holes and including slating reflecting faces and flat reflecting faces which are divisionally arranged so that their arrangement patterns are different for each of the assigned numbers of the disk placing portions; a light emitting element provided behind the rear surface of the rotary tray for emitting light toward the belt-like portion; a light receiving element provided behind the rear surface of the rotary tray for receiving light reflected from the belt-like portion; and a controller; wherein the controller, in accordance with a disk number designating signal, determines whether or not the disk is placed on a pertinent disk placing portion according to whether or not the light receiving element receives light reflected through the disk detecting hole while rotating the rotary tray and emitting light from the light emitting element, identifies the assigned number of the pertinent disk placing portion in such a manner that the light receiving element receives patterned light reflected from the reflecting area and corresponding to the arrangement pattern, and stops rotation of the rotary tray to stop the pertinent disk placing portion at a prescribed position.

In accordance with this configuration, in the state where the rotary tray is rotating, when the reflecting area in which the slanting reflecting faces and flat reflecting faces are divisionally arranged is irradiated with the light emitted from the light emitting element, most of the light reflected from the slanting reflecting face is not incident on the light receiving element whereas most of the light reflected from the flat reflecting face is incident on the light receiving element. Therefore, since the receiving element receives the reflected light in the pattern corresponding to the assigned number of the pertinent disk placing portion, the controller determines the assigned number of the pertinent disk placing portion on the basis of the output from the light receiving element. Thus, by knowing the assigned number of the pertinent disk placing portion, the rotary position of the rotary tray, i.e., position of the pertinent disk placing portion can be known.

Further, in the state where the disk is placed on the pertinent disk placing portion, when the disk detecting hole is irradiated with the light emitted from the light emitting element, the light is reflected from the disk and most of the reflected light is received by the light receiving element. Therefore, when the disk detecting hole is irradiated with the light emitted from the light emitting element and the reflected light is received by the light receiving element, it can be known that the disk is placed on the pertinent disk placing portion. When the reflected light is not received by the light receiving element, it can be known that the disk is not placed on the pertinent disk placing portion.

Accordingly, in accordance with the first aspect, since the rotary tray rotary position detecting means corresponding to the rotary sensor and the disk presence/absence detecting means corresponding to the disk detecting sensor can be realized by a single light emitting element and a single light receiving element, their configuration can be simplified and the production cost can be reduced.

According to a second aspect of the invention, there is provided a disk identifying device including: a rotary tray having a plurality of disk placing portions on each of which a disk as a recording medium is to be placed and each of which has an assigned number; a belt-like portion concentrically formed on a rear surface of the rotary tray, the belt-like portion having disk detecting holes each corresponding to a position of each of the disk placing portions, and light-receiving areas each formed between adjacent disk detecting holes and including light-absorptive color light-receiving faces and light-reflective color light-receiving faces which are divisionally arranged so that their arrangement patterns are different for each of the assigned numbers of the disk placing portions; a light emitting element provided behind the rear surface of the rotary tray for emitting light toward the belt-like portion; a light receiving element provided behind the rear surface of the rotary tray for receiving light reflected from the belt-like portion; and a controller; wherein the controller, in accordance with a disk number designating signal, determines whether or not the disk is placed on a pertinent disk placing portion according to whether or not the light receiving element receives light reflected through the disk detecting hole while rotating the rotary tray and emitting light from the light emitting element, identifies the assigned number of the pertinent disk placing portion in such a manner that the light receiving element receives patterned light reflected from the light-receiving area and corresponding to the arrangement pattern, and stops rotation of the rotary tray to stop the pertinent disk placing portion at a prescribed position.

In this configuration, in the state where the rotary tray is rotating, when the light-receiving area in which the light-absorptive color light-receiving faces and light-reflective color light-receiving faces are divisionally arranged is irradiated with the light emitted from the light emitting element, most of the light reflected from the light-absorptive face is not incident on the light receiving element whereas most of the light reflected from the light-reflective color light-receiving face is incident on the light receiving element. Therefore, since the receiving element receives the reflected light in the pattern corresponding to the assigned number of the pertinent disk placing portion, the controller determines the assigned number of the pertinent disk placing portion on the basis of the output from the light receiving element. Thus, by knowing the assigned number of the pertinent disk placing portion, the rotary position of the rotary tray, i.e., position of the pertinent disk placing portion can be known.

Further, in the state where the disk is placed on the pertinent disk placing portion, when the disk detecting hole is irradiated with the light emitted from the light emitting element, the light is reflected from the disk and most of the reflected light is received by the light receiving element. Therefore, when the disk detecting hole is irradiated with the light emitted from the light emitting element and the reflected light is received by the light receiving element, it can be known that the disk is placed on the pertinent disk placing portion. When the reflected light is not received by the light receiving element, it can be known that the disk is not placed on the pertinent disk placing portion.

Accordingly, since the rotary tray rotary position detecting means corresponding to the rotary sensor and the disk presence/absence detecting means corresponding to the disk detecting sensor can be realized by a single light emitting element and a single light receiving element, their configuration can be simplified and the production cost can be reduced.

According to a third aspect of the invention, there is provided a disk identifying device including: a rotary tray having a plurality of disk placing portions on each of which a disk as a recording medium is to be placed and each of which has an assigned number; a belt-like portion concentrically formed on a rear surface of the rotary tray, the belt-like portion having disk presence/absence detecting areas each for detecting the presence/absence of the disk on each of the disk placing portions on the basis of reflected light, and reflected light pattern forming areas each for identifying a position of a pertinent disk placing portion; alight emitting element provided behind the rear surface of the rotary tray for emitting light toward the belt-like portion; and a light receiving element provided behind the rear surface of the rotary tray for receiving light reflected from the belt-like portion; wherein rotation of the rotary tray is stopped to stop the pertinent disk placing portion at a prescribed position in accordance with a disk number designating signal by identifying the assigned number assigned to the pertinent disk placing portion.

In accordance with this configuration, in the state where the rotary tray is rotating, when the reflected light pattern forming area is irradiated with the light emitted from the light emitting element, the reflected light pattern is incident on the light receiving element. Therefore, since the receiving element receives the reflected light in the pattern corresponding to the assigned number of the pertinent disk placing portion, the controller determines the assigned number of the pertinent disk placing portion on the basis of the output from the light receiving element. Thus, by knowing the assigned number of the pertinent disk placing portion, the rotary position of the rotary tray, i.e., position of the pertinent disk placing portion can be known.

Further, in the state where the disk is placed on the pertinent disk placing portion, when the disk detecting hole is irradiated with the light emitted from the light emitting element, the light is reflected from the disk and most of the reflected light is received by the light receiving element. Therefore, when the disk detecting hole is irradiated with the light emitted from the light emitting element and the reflected light is received by the light receiving element, it can be known that the disk is placed on the pertinent disk placing portion. When the reflected light is not received by the light receiving element, it can be known that the disk is not placed on the pertinent disk placing portion.

Accordingly, since the rotary tray rotary position detecting means corresponding to the rotary sensor and the disk presence/absence detecting means corresponding to the disk detecting sensor can be realized by a single light emitting element and a single light receiving element, their configuration can be simplified and the production cost can be reduced.

According to a fourth aspect of the invention, the disk presence/absence detecting areas are disk detecting holes corresponding to the positions of the disk placing portions, respectively; and the reflected light pattern forming areas are reflecting areas each formed between adjacent disk detecting holes and having slating reflecting faces and flat reflecting faces which are divisionally arranged so that their arrangement patterns are different for the assigned numbers of the disk placing portions. Therefore, by only using a single light emitting element and a single light receiving element, it is possible to detect whether or not the disk is placed on the pertinent disk placing portion and the position of the pertinent disk placing portion.

According to a fifth aspect of the invention, the disk presence/absence detecting areas are disk detecting holes corresponding to the positions of the disk placing portions, respectively; and the reflected light pattern forming areas are light-receiving areas each formed between adjacent disk detecting holes and having light-absorptive color light-receiving faces and light-reflective color light-receiving faces which are divisionally arranged so that their arrangement patterns are different for the assigned numbers of the disk placing portions. Therefore, by only using a single light emitting element and a single light receiving element, it is possible to detect whether or not the disk is placed on the pertinent disk placing portion and the position of the pertinent disk placing portion.

According to a sixth aspect of the invention, the device is provided with a controller for determining whether or not the disk is placed on the pertinent disk placing portion according to whether or not the light receiving element receives light reflected from the disk detecting hole by emitting light from the light emitting element while the rotary tray is rotating, and for identifying the assigned number of the pertinent disk placing portion in such a manner that the light receiving element receives patterned light reflected from the reflecting area. Therefore, it is possible to acquire the detection results of whether or not the disk is placed on the pertinent disk placing portion and of the position of the pertinent disk placing portion.

According to a seventh aspect of the invention, the device is provided with a controller for determining whether or not the disk is placed on the pertinent disk placing portion according to whether or not the light receiving element receives light reflected from each the disk detecting hole by emitting light from the light emitting element while the rotary tray is rotating, and for identifying the assigned number of the pertinent disk placing portion in such a manner that the light receiving element receives patterned light reflected from the light-receiving area. Therefore, it is possible to acquire the detection results of whether or not the disk is placed on the pertinent disk placing portion and of the position of the pertinent disk placing portion.

DETAILED DESCRIPTION OF THE PREFFERED EMBODIMENTS

Figure 1:
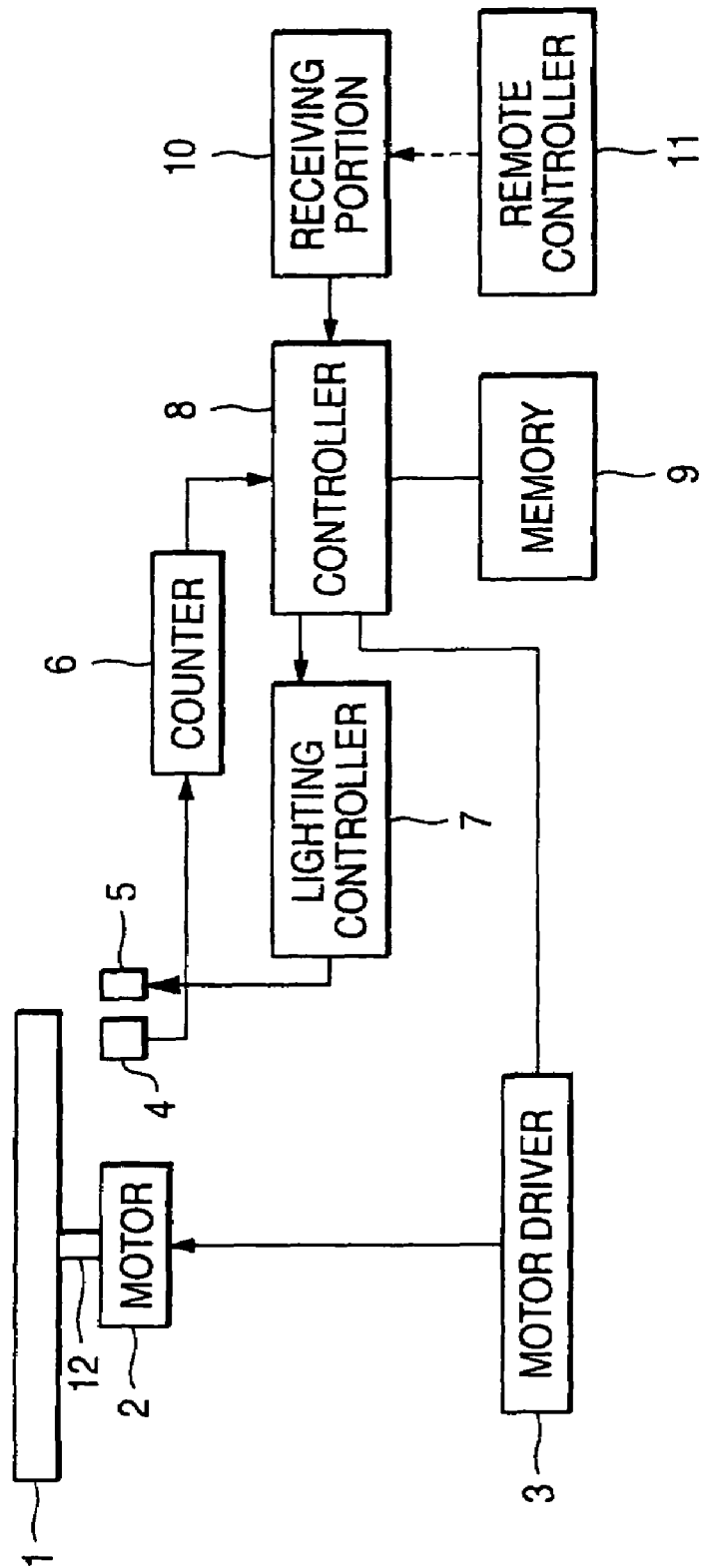
FIG. 1 is a block diagram showing the electric configuration of a disk identifying device according to an embodiment of the invention.
Figure 2:
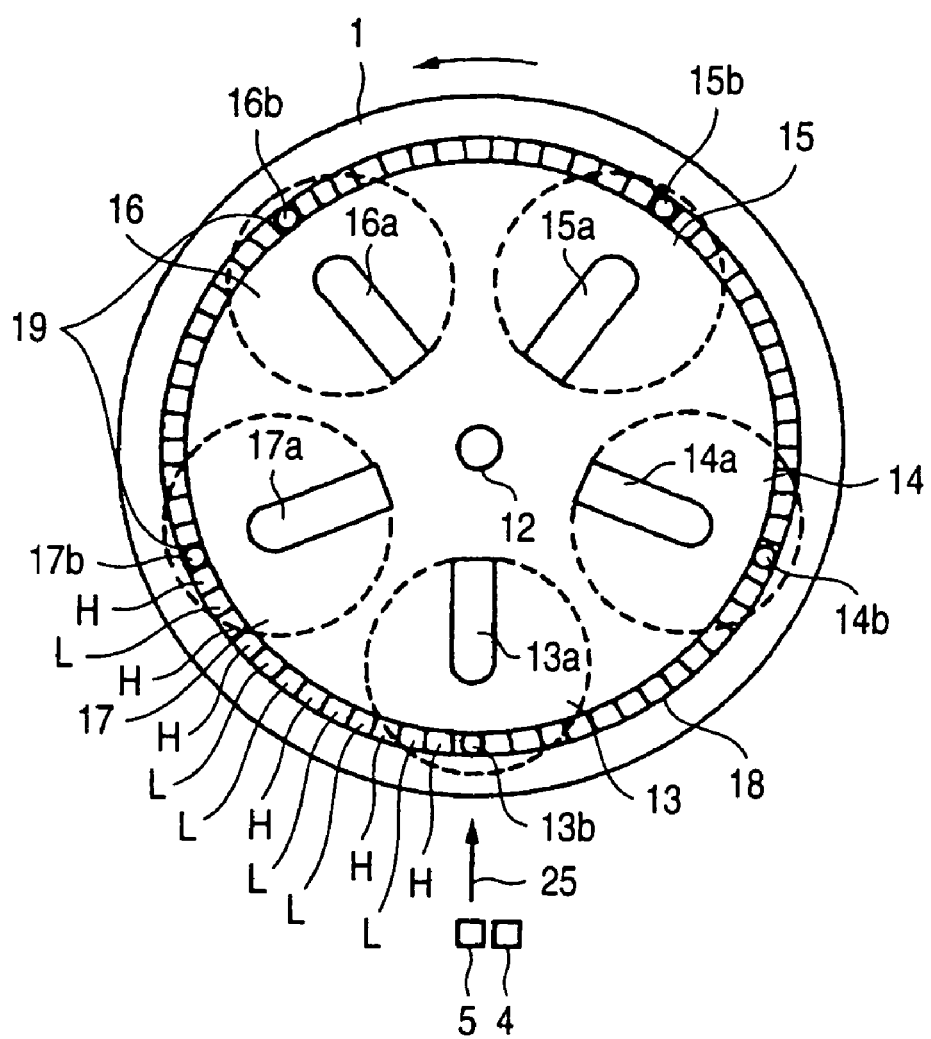
FIG. 2 is a rear view of the configuration of a rotary tray of the disk identifying device according to the embodiment.

Now referring to the accompanying drawings, an description will be given of various embodiments of this invention. FIG. 1 is a block diagram showing the electric configuration of a disk identifying device according to an embodiment of this invention. FIG. 2 is a rear view of the configuration of a rotary tray of the disk identifying device according to the embodiment.

Now referring to FIG. 2, an explanation will be given of the configuration of the rotary tray employed in the embodiment. A rotary tray 1 has a rotary shaft 12 which is disk-shaped and fixed at a central position. On the surface of the rotary tray 1, disk placing portions 13, 14, 15, 16 and 17 on which five disks can be placed are arranged at regular intervals. In the disk placing portions 13, 14, 15, 16 and 17, slits 13a, 14a, 15a, 16a and 17a are made respectively so that an optical pick-up is accessible to the lower surface (recording face) of each of the placed disks.

A belt-like portion 18 is formed on a concentric circle on the rear surface of the rotary tray 1. On the belt-like portion 18, disk detecting holes 13b, 14b, 15b, 16b and 17b are made so as to correspond to the positions of the disk placing portions 13, 14, 15, 16 and 17. On the belt-like portion 18, reflecting areas 19 are also formed. Each of the reflecting areas is composed of slanting reflecting faces L and flat reflecting faces H which are divisionally arranged. Their arrangement patters are arranged between the adjacent ones of the disk detecting holes 13b, 14b, 15b, 16b and 17b so that they are different for the assigned numbers of the disk placing portions 13, 14, 15, 16 and 17. The reflecting faces L and H of each arrangement pattern are arranged in a counter-clockwise direction when viewed from the rear surface of the rotary tray 1.

In FIG. 1, the disk identifying device is provided in a disk player for reproducing the recorded information of each of the disks placed on the disk placing portions 13, 14, 15, 16 and 17 arranged on the rotary tray 1. The disk identifying device includes a light emitting element 5, a light receiving element 4, a counter 6, a lighting controller 7, a controller 8, a memory 9, a receiving portion 10 and a remote controller 11.

The rotary shaft 12 of the rotary tray 1 is coupled with a shaft of the motor 2. The rotary tray 1 is adapted to be rotated by the motor 2 which is driven by a motor driver 3. The counter 6 serves to count output pulses from the light receiving element 4. The lighting controller 7 serves to control the lighting of the light emitting element 5. The memory 9 serves to store the number data for identifying the disk placing portions 13, 14, 15, 16 and 17 (see FIG. 2).

The remote controller 11 includes a power key, a play key, a stop key, a ten key, an up-down key and a disk select key which are provided for operating the disk player. When any key of these keys is operated, an infrared signal corresponding to the operation is transmitted. The receiving portion 10, when receives the infrared signal from the remote controller 11, converts the infrared signal into an electric signal to be transferred to the controller 8.

The controller 8 performs reproduction control in response to the command from the remote controller 1, in which each of circuits for a reproducing system is controlled to rotates/drive the rotary tray 1, and thereafter, the rotation of the rotary tray 1 is controlled according to the counted value from the counter 6 so that the disk placing portion with a selected disk number is stopped at a reproducing position where an optical pick-up (not shown) is located.

Figure 3A:
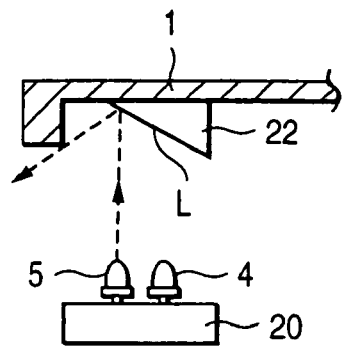
FIGS. 3A to 3D are views each for explaining the arrangement pattern formed on the rear surface of the rotary tray and an arrangement of a light emitting element and light receiving element in the embodiment.
Figure 3B:
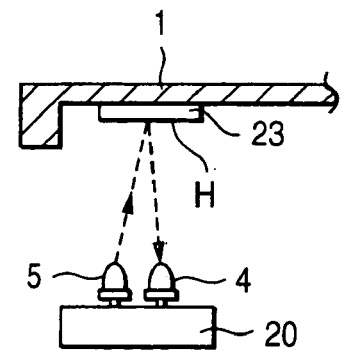

FIGS. 3A to 3D are views each for explaining the arrangement pattern formed on the rear surface of the rotary tray 1 and an arrangement of the light emitting element 5 and light receiving element 4 in this embodiment. On the belt-like portion formed concentrically on the rear surface of the rotary tray, wedge portions 22 each having a slanting reflecting face L as seen from FIG. 3A and flat portions each having a flat reflecting face H as seen from FIG. 3B are formed according to arrangement patters for identifying the respective disk placing portions 13, 14, 15, 16 and 17. The wedge portion 22 and flat portion 23 can be formed by resin-molding them integrally to the rotary tray 1. Further, on the belt-like portion, as seen from FIG. 3C, the disk detecting hole 24 is formed so as to correspond to each of the disk placing portions 13, 14, 15, 16 and 17.

The light emitting element 5 is attached to a base plate 20 so that it can emit light toward the belt-like portion. The light receiving element 4 is attached to a base plate 20 so that it can receive the light reflected from the belt-like portion.

Figure 3C:
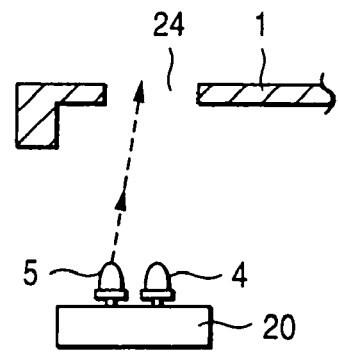
Figure 3D:
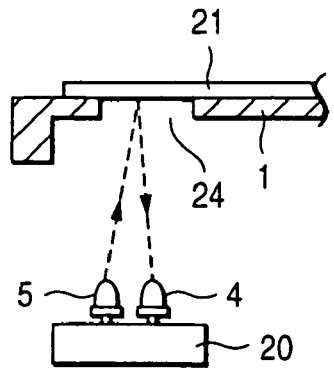

FIG. 3A shows the status where the light emitted from the light emitting element 5 is reflected from the reflecting face L and the reflected light does not almost reach the light receiving element 4. FIG. 3B shows the status where the light emitted from the light emitting element 5 is reflected from the flat reflecting face H and most of the reflected light is received by the light receiving element 4. FIG. 3C shows the status where the light emitted from the light emitting element 5 passes through the disk detecting hole 24 and hence is not received by the light receiving element 4. FIG. 3D shows the status where the light emitted from the light emitting element 5 is reflected from the rear surface (recording face) through the disk detecting hole 24 and most of the reflected light is received by the light receiving element 4. Incidentally, the illustration of disk 21 indicates that it is placed on the disk placing portion formed in the rotary tray 1.

Figure 4:
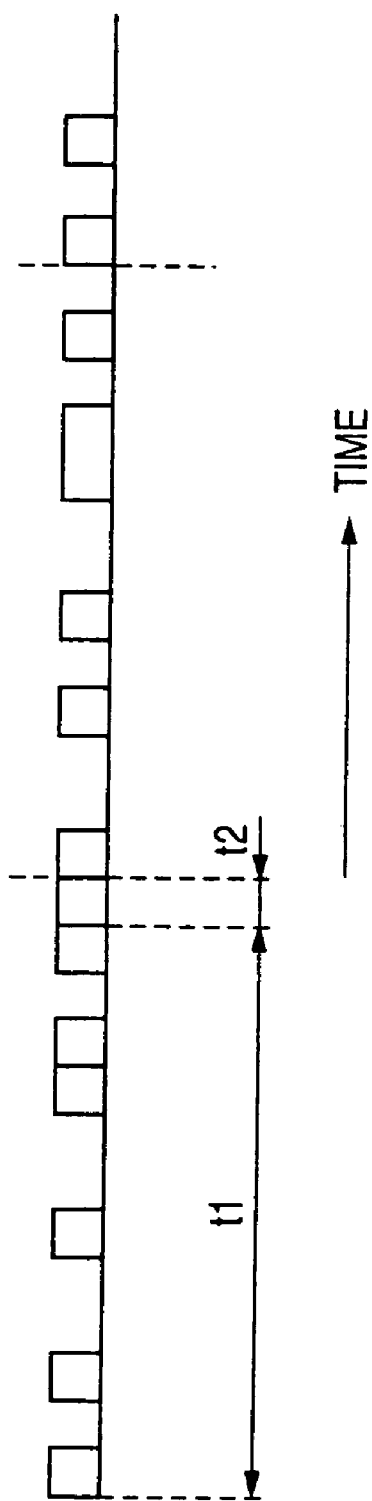
FIG. 4 is a signal waveform chart of a pulse signal which is produced as an electric signal when the light receiving element receives reflected light in the embodiment.

FIG. 4 is a signal waveform chart of a pulse signal which is produced as an electric signal when the light receiving element 4 receives the reflected light (reflected light pattern) in this embodiment. Concerning this pulse signal, the signal during period t1 indicates a count-start directing signal, an assigned number of the pertinent disk placing portion, and a brake directing signal. The signal during period t2 indicates a disk presence/absence signal for detecting whether or not the disk is placed on the pertinent disk placing portion.

The signal during period t1 is a signal where the slanting reflecting faces L and flat reflecting faces H are arranged in a manner of 'H', 'L', 'H', 'L', 'L', 'H', 'L' 'L' "H' 'H', 'L', 'H' between the disk detecting hole 13b and disk detecting hole 17b on the rear surface of the rotary tray 1 shown in FIG. 2. Incidentally, the first flat reflecting face H serves to generate a count start directing signal of starting counting. The last flat reflecting face H serves to generate a brake directing signal of stopping the rotary tray 1. The signal during t2 represents the signal where the disk is placed on the disk placing portion 17 and is at 'H' level. Where the disk is not placed on the disk placing portion 17, the signal during period t2 is at 'L' level.

Now referring to FIGS. 1 to 4, an explanation will be given of the operation of the disk identifying device according to this embodiment. An explanation will be given of the case where the disk is placed on the fifth disk placing portion 17 among the disk placing portions 13, 14, 15, 16 and 17 on the rotary tray 1.

In the case where a user wants to reproduce the recorded information on the disk placed on the disk placing portion 17, when the user operates the power key of the remote controller 11 and thereafter operates the ten key of e.g. numeral 5, a reproduction directing signal for the disk on the fifth disk placing portion 17 is transmitted from the remote controller 11. When the controller 8 receives the reproduction directing signal for the disk on the fifth disk placing portion 17 through the receiving portion 10, it stores, in a prescribed area, the identifying data (assigned number) for identifying the fifth disk placing portion 17. The controller 8 transmits a drive directing signal to the motor driver 3, and also transmits a lighting directing signal to the lighting controller 7. Thus, the motor 2 is rotation-driven so that the rotation of the rotary tray 1 starts in a positive direction (arrow direction in FIG. 2, i.e., clockwise direction when the rotary tray is viewed from the top).

Since the light emitting element 5 emits light, when the fifth disk placing portion 17 is rotated onto the light emitted line (arrow 25 in FIG. 2), the light emitted from the light emitting element 5 successively hits on the reflecting faces H, L, H, L, L, H, L, L, H, H, L, H so that the receiving element 4 having received the reflected light produces the pulse signal. This pulse signal is a signal indicative of logic 1, 0, 1, 0, 0, 1, 0, 0, 1, 1, 0, 1. The counter 6, when received the first pulse (logic 1) during the period t1, starts to count the counting operation so that the counted output is given to the controller 8. The controller 8 compares the data of the counted output and the identifying data (assigned number) previously stored in the memory 9, and when the both of them matches, the controller 8 detects that the fifth disk placing portion 17 has been approached.

Incidentally, as described above, of the pulses during period t1, the first pulse is used as a count start directing command of starting the counting in the counter 6, and the last pulse is used as a brake directing signal of stopping the rotary tray 1.

When the fifth disk placing portion 17 further approaches so that the disk detecting hole 17b comes on the light emitted line indicated by arrow 25, the light emitted from the light emitting element 5 is reflected at the disk placed on the fifth disk placing portion 17. When the reflected light is received by the light receiving element 4, the signal during period t2 becomes H level. The H level signal is supplied to the controller 8 through the counter 6 so that the controller 8 recognizes that the disk is placed on the fifth disk placing portion 17.

Then, the controller 8 controls the motor driver 3 to stop the rotation of the rotary tray 1 so that the fifth disk placing portion 17 comes to the reproduction position where an optical pick-up device (not shown) is located. This permits the reproduction operation for the disk placed on the fifth disk placing portion 17. Incidentally, where no disk is placed on the fifth disk placing portion 17, the rotary tray 1 continues to rotate, thereby detecting the disk placing portion on which the disk assigned by the user is placed by the similar operation.

Incidentally, in FIG. 2, the reflecting face is divided into 12 segments. However, in this case, in order to discriminate the five disk placing portions 13, 14, 15, 16 and 17 from one another, as long as the reflecting faces are represented by the binary system, five or more reflecting faces inclusive of those for the count start directing command and brake directing signal may be provided for the period t1 (FIG. 4). Further, the number of the disk placing portions should not be limited to 5. However, as the number of pulses (density of the arrangement pattern) during period t1 increases, the accuracy of detecting the position of the disk placing portion can be increased.

In this embodiment, the arrangement pattern of the slanting reflecting faces L and flat reflecting faces H was represented by the binary system according to the assigned number of the disk placing portion, but may be represented by the decimal system. For example, the arrangement patterns can be provided so that a single pulse is generated for the first disk placing portion, two pulses are generated for the second disk placing portion, three pulses are generated for the third disk placing portion, four pulses are generated for the fourth disk placing portion and five pulses are generated for the fifth disk placing portion.

Further, in this embodiment, first, in order to detect the position of the disk placing portion, the information in the reflecting area was detected, and thereafter, in order to detect the presence/absence of the disk, the information in the disk detecting hole was detected. However, first, the information in the disk detecting hole may be detected and thereafter the information in the reflecting area may be detected. In this case, if no disk is placed on the pertinent disk placing portion, the position detecting processing for the disk placing portion can be omitted, thereby shortening the processing time.

In accordance with this embodiment, in the state where the rotary tray 1 is rotating, when the reflecting area 19 in which the slanting reflecting faces L and flat reflecting faces H are divisionally arranged is irradiated with the light emitted from the light emitting element, most of the light reflected from the slanting reflecting face L is not incident on the light receiving element 4 whereas most of the light reflected from the flat reflecting face H is incident on the light receiving element 4. Therefore, since the receiving element 4 receives the reflected light in the pattern corresponding to the assigned number of the pertinent disk placing portion 17, the controller 8 determines the assigned number of the pertinent disk placing portion 17 on the basis of the output from the light receiving element 4. Thus, by knowing the assigned number of the pertinent disk placing portion 17, the rotary position of the rotary tray 1, i.e., position of the pertinent disk placing portion 17 can be known.

Further, in the state where the disk 21 is placed on the pertinent disk placing portion 17, when the disk detecting hole 17b is irradiated with the light emitted from the light emitting element 5, the light is reflected from the disk 21 and most of the reflected light is received by the light receiving element 4. Therefore, when the disk detecting hole 17b is irradiated with the light emitted from the light emitting element 5 and the reflected light is received by the light receiving element 4, it can be known that the disk 21 is placed on the pertinent disk placing portion 17. When the reflected light is not received by the light receiving element 4, it can be known that the disk 21 is not placed on the pertinent disk placing portion 17. Incidentally, the above operation applies to the other disk placing portions 13, 14, 15 and 16.

Accordingly, in accordance with this embodiment, since the rotary tray rotary position detecting means corresponding to the rotary sensor and the disk presence/absence detecting means corresponding to the disk detecting sensor can be realized by a single light emitting element 5 and a single light receiving element 1, their configuration can be simplified and the production cost can be also reduced.

Figure 5A:
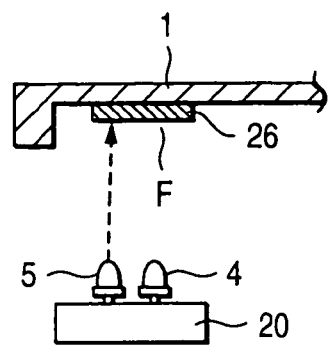
FIGS. 5A to 5D are views each for explaining the arrangement pattern formed on the rear surface of a rotary tray and an arrangement of the light emitting element and light receiving element according to another embodiment of the invention.
Figure 5B:
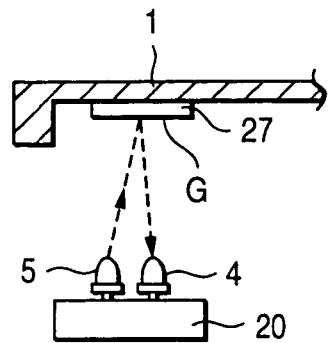

FIGS. 5A to 5D are views each for explaining the arrangement pattern formed on the rear surface of a rotary tray 1 and an arrangement of a light-emitting element 5 and a light-receiving element 4 according to another embodiment. On a belt-like portion formed concentrically on the rear surface of the rotary tray, flat portions 26 each having a black light-receiving face F as seen from FIG. 5A and flat portions 27 each having a silver light-receiving face F as seen from FIG. 5B are formed according to arrangement patterns for identifying the respective disk placing portions 13, 14, 15, 16 and 17. The flat portion 26 and flat portion 27 can be formed by e.g. affixing a color tape on the rear surface of the rotary tray 1 or color-painting the rear surface thereof. Further, on the belt-like portion, as seen from FIG. 5C, a disk detecting hole 24 is formed so as to correspond to each of the disk placing portions 13, 14, 15, 16 and 17.

The light emitting element 5 is attached to a base plate 20 so that it can emit light toward the belt-like portion. The light-receiving element 4 is attached to a base plate 20 so that it can receive the light reflected from the belt-like portion.

Figure 5C:
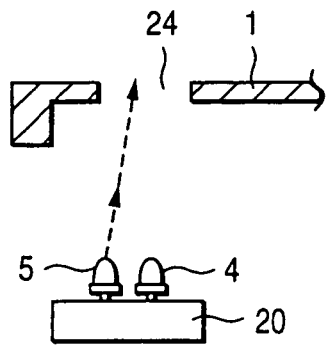
Figure 5D:
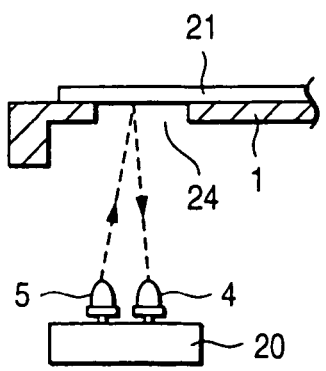

FIG. 5A shows the status where the light emitted from the light emitting element 5 hits on the black light-receiving face F and absorbed by it so that the reflected light does not almost reach the light receiving element 4. FIG. 5B shows the status where the light emitted from the light emitting element 5 is reflected from the silver light-receiving face G and most of the reflected light is received by the light receiving element 4. FIG. 5C shows the status where the light emitted from the light emitting element 5 passes through the disk detecting hole 24 and hence is not received by the light receiving element 4. FIG. 5D shows the status where the light emitted from the light emitting element 5 is reflected from the rear surface (recording face) through the disk detecting hole 24 and most of the reflected light is received by the light receiving element 4. Incidentally, the illustration of disk 21 indicates that it is placed on the disk placing portion formed in the rotary tray 1.

The slanting reflecting face L shown in FIG. 2 corresponds to the black light-receiving face F shown in FIG. 5A. The flat reflecting face H shown in FIG. 2 corresponds to the silver light-receiving face H shown in FIG. 5B. In other words, in this embodiment, the reflecting face L in the previous embodiment is replaced by the light receiving face F, and the reflecting face H is replaced by the light-receiving face G. The operation of these faces will be omitted here.

Incidentally, in this embodiment, the light-receiving face F was colored in black. However, the color should not be limited to black, but may be a dark color capable of absorbing light as much as possible. Further, the light-receiving face G was colored in silver. However, the color should not be limited to silver, but may be a reflective color capable of reflecting light as much as possible.

In accordance with this embodiment, in the state where the rotary tray 1 is rotating, when the light-receiving area in which the light-absorptive color light-receiving faces F and light-reflective color light-receiving faces G are divisionally arranged is irradiated with the light emitted from the light emitting element 5, most of the light reflected from the light-absorptive face F is not incident on the light receiving element 4 whereas most of the light reflected from the light-reflective color light-receiving face G are incident on the light receiving element 4. Therefore, since the receiving element 4 receives the reflected light in the pattern corresponding to the assigned number of the pertinent disk placing portion 17, the controller 8 determines the assigned number of the pertinent disk placing portion 17 on the basis of the output from the light receiving element 4. Thus, by knowing the assigned number of the pertinent disk placing portion 17, the rotary position of the rotary tray 1, i.e., position of the pertinent disk placing portion 17 can be known.

Further, in the state where the disk 21 is placed on the pertinent disk placing portion 17, when the disk detecting hole 17b is irradiated with the light emitted from the light emitting element 5, the light is reflected from the disk 21 and most of the reflected light is received by the light receiving element 4. Therefore, when the disk detecting hole 17b is irradiated with the light emitted from the light emitting element 5 and the reflected light is received by the light receiving element 4, it can be known that the disk 21 is placed on the pertinent disk placing portion 17. When the reflected light is not received by the light receiving element 4, it can be known that the disk 21 is not placed on the pertinent disk placing portion 17. Incidentally, the above operation applies to the other disk placing portions 13, 14, 15 and 16.

In accordance with this embodiment, since the rotary tray rotary position detecting means corresponding to the rotary sensor and the disk presence/absence detecting means corresponding to the disk detecting sensor can be realized by a single light emitting element 5 and a single light receiving element 1, their configuration can be simplified and the production cost can be also reduced.

As understood from the description hitherto made, according to the first aspect of the invention, in the state where the rotary tray is rotating, when the reflecting area in which the slanting reflecting faces and flat reflecting faces are divisionally arranged is irradiated with the light emitted from the light emitting element, most of the light reflected from the slanting reflecting face is not incident on the light receiving element whereas most of the light reflected from the flat reflecting face is incident on the light receiving element. Therefore, since the receiving element receives the reflected light in the pattern corresponding to the assigned number of the pertinent disk placing portion, the controller determines the assigned number of the pertinent disk placing portion on the basis of the output from the light receiving element. Thus, by knowing the assigned number of the pertinent disk placing portion, the rotary position of the rotary tray, i.e., position of the pertinent disk placing portion can be known.

Further, in the state where the disk is placed on the pertinent disk placing portion, when the disk detecting hole is irradiated with the light emitted from the light emitting element, the light is reflected from the disk and most of the reflected light is received by the light receiving element Therefore, when the disk detecting hole is irradiated with the light emitted from the light emitting element and the reflected light is received by the light receiving element, it can be known that the disk is placed on the pertinent disk placing portion. When the reflected light is not received by the light receiving element, it can be known that the disk is not placed on the pertinent disk placing portion.

Accordingly, since the rotary tray rotary position detecting means corresponding to the rotary sensor and the disk presence/absence detecting means corresponding to the disk detecting sensor can be realized by a single light emitting element and a single light receiving element, their configuration can be simplified and the production cost can be reduced.

According to the second aspect of the invention, in the state where the rotary tray is rotating, when the light-receiving area in which the light-absorptive color light-receiving faces and light-reflective color light-receiving faces are divisionally arranged is irradiated with the light emitted from the light emitting element, most of the light reflected from the light-absorptive face is not incident on the light receiving element whereas most of the light reflected from the light-reflective color light-receiving face is incident on the light receiving element. Therefore, since the receiving element receives the reflected light in the pattern corresponding to the assigned number of the pertinent disk placing portion, the controller determines the assigned number of the pertinent disk placing portion on the basis of the output from the light receiving element. Thus, by knowing the assigned number of the pertinent disk placing portion, the rotary position of the rotary tray, i.e., position of the pertinent disk placing portion can be known.

Further, in the state where the disk is placed on the pertinent disk placing portion, when the disk detecting hole is irradiated with the light emitted from the light emitting element, the light is reflected from the disk and most of the reflected light is received by the light receiving element. Therefore, when the disk detecting hole is irradiated with the light emitted from the light emitting element and the reflected light is received by the light receiving element, it can be known that the disk is placed on the pertinent disk placing portion. When the reflected light is not received by the light receiving element, it can be known that the disk is not placed on the pertinent disk placing portion.

Accordingly, since the rotary tray rotary position detecting means corresponding to the rotary sensor and the disk presence/absence detecting means corresponding to the disk detecting sensor can be realized by a single light emitting element and a single light receiving element, their configuration can be simplified and the production cost can be reduced.

According to the third aspect of the invention, in the state where the rotary tray is rotating, when the reflected light pattern forming area is irradiated with the light emitted from the light emitting element, the reflected light pattern is incident on the light receiving element. Therefore, since the receiving element receives the reflected light in the pattern corresponding to the assigned number of the pertinent disk placing portion, the controller determines the assigned number of the pertinent disk placing portion on the basis of the output from the light receiving element. Thus, by knowing the assigned number of the pertinent disk placing portion, the rotary position of the rotary tray, i.e., position of the pertinent disk placing portion can be known.

Further, in the state where the disk is placed on the pertinent disk placing portion, when the disk detecting hole is irradiated with the light emitted from the light emitting element, the light is reflected from the disk and most of the reflected light is received by the light receiving element. Therefore, when the disk detecting hole is irradiated with the light emitted from the light emitting element and the reflected light is received by the light receiving element, it can be known that the disk is placed on the pertinent disk placing portion. When the reflected light is not received by the light receiving element, it can be known that the disk is not placed on the pertinent disk placing portion.

Accordingly, since the rotary tray rotary position detecting means corresponding to the rotary sensor and the disk presence/absence detecting means corresponding to the disk detecting sensor can be realized by a single light emitting element and a single light receiving element, their configuration can be simplified and the production cost can be also reduced.

According to the fourth aspect of the invention, the disk presence/absence detecting areas are disk detecting holes corresponding to the positions of the disk placing portions, respectively; and the reflected light pattern forming areas are reflecting areas each formed between adjacent disk detecting holes and having slating reflecting faces and flat reflecting faces which are divisionally arranged so that their arrangement patterns are different for the assigned numbers of the disk placing portions. Therefore, by only using a single light emitting element and a single light receiving element, it is possible to detect whether or not the disk is placed on the pertinent disk placing portion and to detect the position of the pertinent disk placing portion.

According to the fifth aspect of the invention, the disk presence/absence detecting areas are disk detecting holes corresponding to the positions of the disk placing portions, respectively; and the reflected light pattern forming areas are light-receiving areas each formed between adjacent disk detecting holes and having light-absorptive color light-receiving faces and light-reflective color light-receiving faces which are divisionally arranged so that their arrangement patterns are different for the assigned numbers of the disk placing portions. Therefore, by only using a single light emitting element and a single light receiving element, it is possible to detect whether or not the disk is placed on the pertinent disk placing portion and the position of the pertinent disk placing portion.

According to the sixth aspect of the invention, the device is provided with a controller for determining whether or not the disk is placed on the pertinent disk placing portion according to whether or not the light receiving element receives light reflected from the disk detecting hole by emitting light from the light emitting element while the rotary tray is rotating, and for identifying the assigned number of the pertinent disk placing portion in such a manner that the light receiving element receives patterned light reflected from the reflecting area.

Therefore, it is possible to acquire the detection results of whether or not the disk is placed on the pertinent disk placing portion and of the position of the pertinent disk placing portion.

According to the seventh aspect of the invention, the device is provided with a controller for determining whether or not the disk is placed on the pertinent disk placing portion according to whether or not the light receiving element receives light reflected from the disk detecting hole by emitting light from the light emitting element while the rotary tray is rotating, and for identifying the assigned number of the pertinent disk placing portion in such a manner that the light receiving element receives patterned light reflected from the light-receiving area. Therefore, it is possible to acquire the detection results of whether or not the disk is placed on the pertinent disk placing portion and of the position of the pertinent disk placing portion.

What is claimed is:

1. A disk identifying device comprising:
   a rotary tray having a plurality of disk placing portions on each of which a disk as a recording medium is to be placed and each of which has an assigned number;
   a belt-like portion concentrically formed on a rear surface of the rotary tray, the belt-like portion having disk detecting holes each corresponding to a position of each of the disk placing portions, and reflecting areas each formed between adjacent disk detecting holes and including slanting reflecting faces and flat reflecting faces which are divisionally arranged so that their arrangement patterns are different for each of the assigned numbers of the disk placing portions;
   a light emitting element provided behind the rear surface of the rotary tray for emitting light toward the belt-like portion;
   a light receiving element provided behind the rear surface of the rotary tray for receiving light reflected from the belt-like portion; and
   a controller;
   wherein the controller, in accordance with a disk number designating signal, determines whether or not the disk is placed on a pertinent disk placing portion according to whether or not the light receiving element receives light reflected through the disk detecting hole while rotating the rotary tray and emitting light from the light emitting element, identifies the assigned number of the pertinent disk placing portion in such a manner that the light receiving element receives patterned light reflected from the reflecting area and corresponding to the arrangement pattern, and stops rotation of the rotary tray to stop the pertinent disk placing portion at a prescribed position.

2. A disk identifying device comprising:
   a rotary tray having a plurality of disk placing portions on each of which a disk as a recording medium is to be placed and each of which has an assigned number;
   a belt-like portion concentrically formed on a rear surface of the rotary tray, the belt-like portion having disk detecting holes each corresponding to a position of each of the disk placing portions, and light-receiving areas each formed between adjacent disk detecting holes and including light-absorptive color light-receiving faces and light-reflective color light-receiving faces which are divisionally arranged so that their arrangement patterns are different for each of the assigned numbers of the disk placing portions;
   a light emitting element provided behind the rear surface of the rotary tray for emitting light toward the belt-like portion;
   a light receiving element provided behind the rear surface of the rotary tray for receiving light reflected from the belt-like portion; and
   a controller;
   wherein the controller, in accordance with a disk number designating signal, determines whether or not the disk is placed on a pertinent disk placing portion according to whether or not the light receiving element receives light reflected through the disk detecting hole while rotating the rotary tray and emitting light from the light emitting element, identifies the assigned number of the pertinent disk placing portion in such a manner that the light receiving element receives patterned light reflected from the light-receiving area and corresponding to the arrangement pattern, and stops rotation of the rotary tray to stop the pertinent disk placing portion at a prescribed position.

3. A disk identifying device comprising:
   a rotary tray having a plurality of disk placing portions on each of which a disk as a recording medium is to be placed and each of which has an assigned number;
   a belt-like portion concentrically formed on a rear surface of the rotary tray, the belt-like portion having disk presence/absence detecting areas each for detecting the presence/absence of the disk on each of the disk placing portions on the basis of reflected light, and reflected light pattern forming areas each for identifying a position of a pertinent disk placing portion; wherein the disk presence/absence detecting areas comprise disk detecting holes corresponding to positions of the disk placing portions, and
   the reflected light pattern forming areas comprise reflecting areas each formed between adjacent disk detecting holes and including slanting reflecting faces and flat reflecting faces which are divisionally arranged so that their arrangement patterns are different for each of the assigned numbers of the disk placing portions;
   a light emitting element provided behind the rear surface of the rotary tray for emitting light toward the belt-like portion; and a light receiving element provided behind the rear surface of the rotary tray for receiving light reflected from the belt-like portion.

4. The disk identifying device according to claim 3, further comprising a controller which determines whether or not the disk is placed on the pertinent disk placing portion according to whether or not the light receiving element receives light reflected through the disk detecting hole while rotating the rotary tray and emitting light from the light emitting element, and which identifies the assigned number of the pertinent disk placing portion in such a manner that the light receiving element receives patterned light reflected from the reflecting area.

5. The disk identifying device according to claim 4, wherein rotation of the rotary tray is stopped to stop the pertinent disk placing portion at a prescribed position in accordance with a disk number designating signal by identifying the assigned number assigned to the pertinent disk placing portion.

6. A disk identifying device comprising:
a rotary tray having a plurality of disk placing portions on each of which a disk as a recording medium is to be placed and each of which has an assigned number;
a belt-like portion concentrically formed on a rear surface of the rotary tray, the belt-like portion having disk presence/absence detecting areas each for detecting the presence/absence of the disk on each of the disk placing portions on the basis of reflected light, and reflected light pattern forming areas each for identifying a position of a pertinent disk placing portion; wherein the disk presence/absence detecting areas comprise disk detecting holes corresponding to positions of the disk placing portions, and the reflected light pattern forming areas comprise light-receiving areas each formed between adjacent disk detecting holes and including light-absorptive color light-receiving faces and light-reflective color light-receiving faces which are divisionally arranged so that their arrangement patterns are different for each of the assigned numbers of the disk placing portions;
a light emitting element provided behind the rear surface of the rotary tray for emitting light toward the belt-like portion; and
a light receiving element provided behind the rear surface of the rotary tray for receiving light reflected from the belt-like portion.

7. The disk identifying device according to claim 6, further comprising a controller which determines whether or not the disk is placed on the pertinent disk placing portion according to whether or not the light receiving element receives light reflected through the disk detecting hole while rotating the rotary tray and emitting light from the light emitting element, and identifies the assigned number of the pertinent disk placing portion in such a manner that the light receiving element receives patterned light reflected from the light-receiving area.

8. The disk identifying device according to claim 7, wherein rotation of the rotary tray is stopped to stop the pertinent disk placing portion at a prescribed position in accordance with a disk number designating signal by identifying the assigned number assigned to the pertinent disk placing portion.

* * * * *